United States Patent
Le

(10) Patent No.: US 8,631,398 B2
(45) Date of Patent: Jan. 14, 2014

(54) METHOD AND APPARATUS FOR FACILITATING CREATION OF A NETWORK INTERFACE

(75) Inventor: Louis Le, San Diego, CA (US)

(73) Assignee: Sony Corporation, Tokyo (JP)

( * ) Notice: Subject to any disclaimer, the term of this patent is extended or adjusted under 35 U.S.C. 154(b) by 429 days.

(21) Appl. No.: 12/886,291

(22) Filed: Sep. 20, 2010

(65) Prior Publication Data
US 2012/0072904 A1    Mar. 22, 2012

(51) Int. Cl.
*G06F 9/445* (2006.01)

(52) U.S. Cl.
USPC .......... 717/174; 717/176; 717/177; 717/178; 714/38.1

(58) Field of Classification Search
None
See application file for complete search history.

(56) References Cited

U.S. PATENT DOCUMENTS

| | | | |
|---|---|---|---|
| 6,003,097 A * | 12/1999 | Richman et al. | 710/8 |
| 6,385,766 B1 * | 5/2002 | Doran et al. | 717/174 |
| 7,281,246 B1 * | 10/2007 | Rapakko et al. | 717/175 |
| 7,503,043 B2 * | 3/2009 | Lupini et al. | 717/175 |
| 7,546,597 B2 * | 6/2009 | Suzuki | 717/175 |
| 7,704,147 B2 * | 4/2010 | Quraishi et al. | 463/42 |
| 7,853,946 B2 * | 12/2010 | Minagawa | 717/178 |
| 7,908,401 B2 * | 3/2011 | Chang | 709/250 |
| 8,220,005 B2 * | 7/2012 | Kobayashi et al. | 719/327 |
| 2002/0065872 A1 * | 5/2002 | Genske et al. | 709/202 |
| 2003/0046680 A1 * | 3/2003 | Gentry | 717/176 |
| 2005/0005042 A1 * | 1/2005 | Fukunaga et al. | 710/62 |
| 2005/0080964 A1 * | 4/2005 | Colvig et al. | 710/200 |
| 2006/0253581 A1 * | 11/2006 | Dixon et al. | 709/225 |
| 2007/0037563 A1 * | 2/2007 | Yang et al. | 455/418 |
| 2007/0234352 A1 * | 10/2007 | Esders et al. | 717/175 |
| 2008/0155333 A1 * | 6/2008 | Brundidge et al. | 714/36 |
| 2008/0244564 A1 * | 10/2008 | Sonkin et al. | 717/175 |
| 2009/0022068 A1 | 1/2009 | Iyer et al. | |
| 2009/0064135 A1 * | 3/2009 | Jimmerson | 717/178 |
| 2009/0106752 A1 * | 4/2009 | Balu et al. | 717/176 |
| 2009/0150881 A1 * | 6/2009 | Lupini et al. | 717/174 |
| 2009/0300598 A1 * | 12/2009 | Choi | 717/173 |
| 2010/0251232 A1 * | 9/2010 | Shinomiya | 717/177 |

FOREIGN PATENT DOCUMENTS

GB    2415073 A    12/2005

* cited by examiner

*Primary Examiner* — Chameli Das
(74) *Attorney, Agent, or Firm* — Moser Taboada

(57) ABSTRACT

A method and apparatus for efficient wireless interface installation is disclosed. In one embodiment, a method for installing a first interface driver and a second interface driver is disclosed. The method comprises iterating a first interface driver installation process until at least one of success or a predetermined number of failures, if the first interface driver installation process is successful, iterating a second interface driver installation process until at least one of success or another predetermined number of failures, and generating an interface for communications between the first interface driver and the second interface driver, if the second interface driver installation process is successful.

18 Claims, 3 Drawing Sheets

METHOD 300

METHOD 300

METHOD AND APPARATUS FOR FACILITATING CREATION OF A NETWORK INTERFACE

BACKGROUND

1. Technical Field

Embodiments of the present disclosure generally relate to communication network interfaces installation technology and, more particularly, to a method and apparatus for facilitating creation of a network interface.

2. Description of the Related Art

People often use various handheld wireless devices, such as mobile phones, electronic book readers, Personal Digital Assistants (PDA), hand-held gaming devices, wireless-enabled laptop computers, portable music players, portable televisions, Wireless Fidelity (Wi-Fi) cards and/or the like. Activities performed by the handheld wireless devices include, for example, listening to Internet radio stations, such as Pandora® and Slacker Radio, downloading and/or watching various multimedia (e.g., movies, television episodes and/or other audio/videos files), executing other entertainment/media applications and/or the like.

Generally, the handheld wireless devices include various components, such as processors, input/output devices, networking components, and/or the like. These components require successful driver installation during power-up operations for proper functioning. Such components, however, are distributed by multiple, different vendors, which often disrupt or prevent the successful driver installation. If the driver installation process fails, then the handheld, wireless device is rendered inoperable. As a result, installing the necessary drivers becomes cumbersome and time consuming for the users.

Therefore, there is a need in the art for an improved method and apparatus for facilitating creation of a network interface between a first controller and a second controller by ensuring the installation of a first interface driver and a second interface driver.

SUMMARY

Various embodiments of the present disclosure generally include a method and apparatus for facilitating wireless interface installation. In one embodiment, a method includes iterating a first interface driver installation process until at least one of success or a predetermined number of failures, if the first interface driver installation process is successful, iterating a second interface driver installation process until at least one of success or another predetermined number of failures, and if the second interface driver installation process is successful, generating an interface for communications between the first interface driver and the second interface driver.

In another embodiment, a method for installing an input/output interface driver and a wireless interface driver is disclosed. The method comprises iterating an input/output interface driver installation process until at least one of success or a predetermined number of failures, if the input/output interface driver installation process succeeds, iterating a wireless interface driver installation process until at least one of success or another predetermined number of failures, and if the wireless interface driver installation process succeeds, generating a network interface for communications between the input/output interface driver and the wireless interface driver.

In a yet another embodiment, a multimedia device is disclosed. The multimedia device includes a first internal controller for iterating a first interface driver installation process until at least one of success or a predetermined number of failures, a second internal controller for iterating a second interface driver installation process until at least one of success or another predetermined number of failures, if the first interface driver installation process is successful, and an interface module for generating an interface for communications between the first interface driver associated with the first internal controller and the second interface driver associated with the second internal controller, if the second interface driver installation process is successful.

Figure 1:
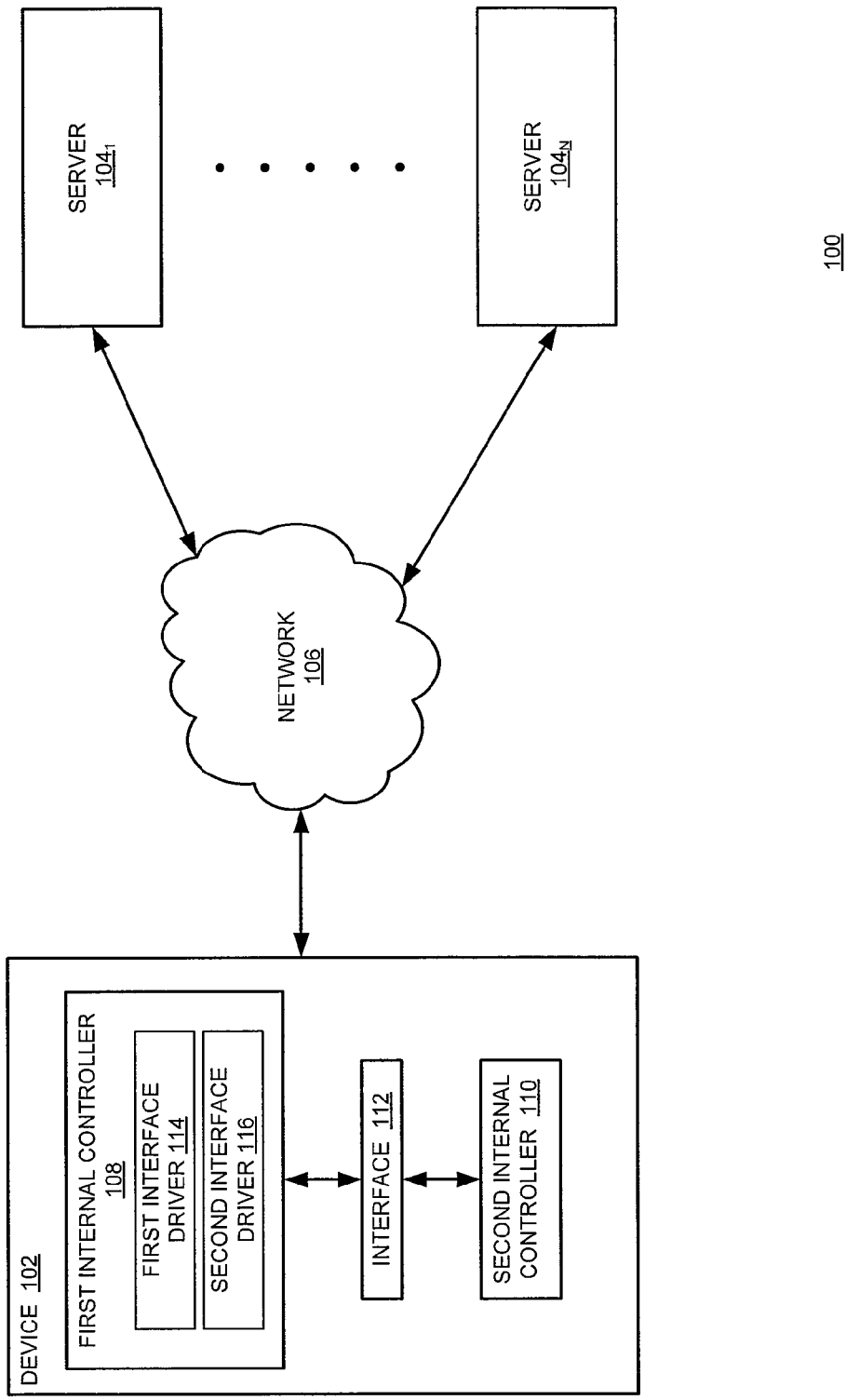
FIG. 1 is a block diagram of a system for facilitating creation of a interface between a first internal controller and a second internal controller, according to one or more embodiments.

While the system and method for performing for efficient wireless interface installation is described herein by way of example for several embodiments and illustrative drawings, those skilled in the art will recognize that the system and method for efficient wireless interface installation is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for efficient wireless interface installation as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of a method and apparatus for efficient network interface installation are described. Various circuitries inside a multimedia device require proper driver installation during power-up operations for proper working. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for facilitating creation of an interface 112 between a first internal controller 108 and a second internal controller 110, according to one or more embodiments. The system 100 includes a device 102 and a plurality of servers 104 ($104_1$, $104_2$ . . . $104_N$) where each coupled to one another through a network 106. The first internal controller 108 communicates with the second internal controller 110 via the interface 112 (i.e., a network interface). By ensuring installation of a first interface driver 114 and a second interface driver 116, the device guarantees operation of the interface 112.

Each of the plurality of servers 104 is a type of computing device (e.g., a laptop, a desktop, a Personal Digital Assistant (PDA), and/or the like) known to one of ordinary skill in the art having the benefit of this disclosure. Each server 104 comprises a CPU, various support circuits and a memory. According to some embodiments, the plurality of servers 104 provide various services to various devices, such as the device 102, throughout the system 100. In one embodiment, the plurality of servers 104 store and distribute various multimedia content (e.g., images, video, audio and/or the like) to the device 102. For example, the plurality of servers 104 may operate Internet Radio stations, such as Pandora® and Slacker Radio®, which stream audio content to the device 102 via the network 106. The audio content conveys various types of information (e.g., news, music, political commentary and/or the like) to a listener.

The network 106 comprises a communication system that connects computing devices by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the Internet or Intranet using various communications infrastructure, such as Ethernet, Wi-Fi, Wi-Max, General Packet Radio Service (GPRS), and the like.

Figure 2:
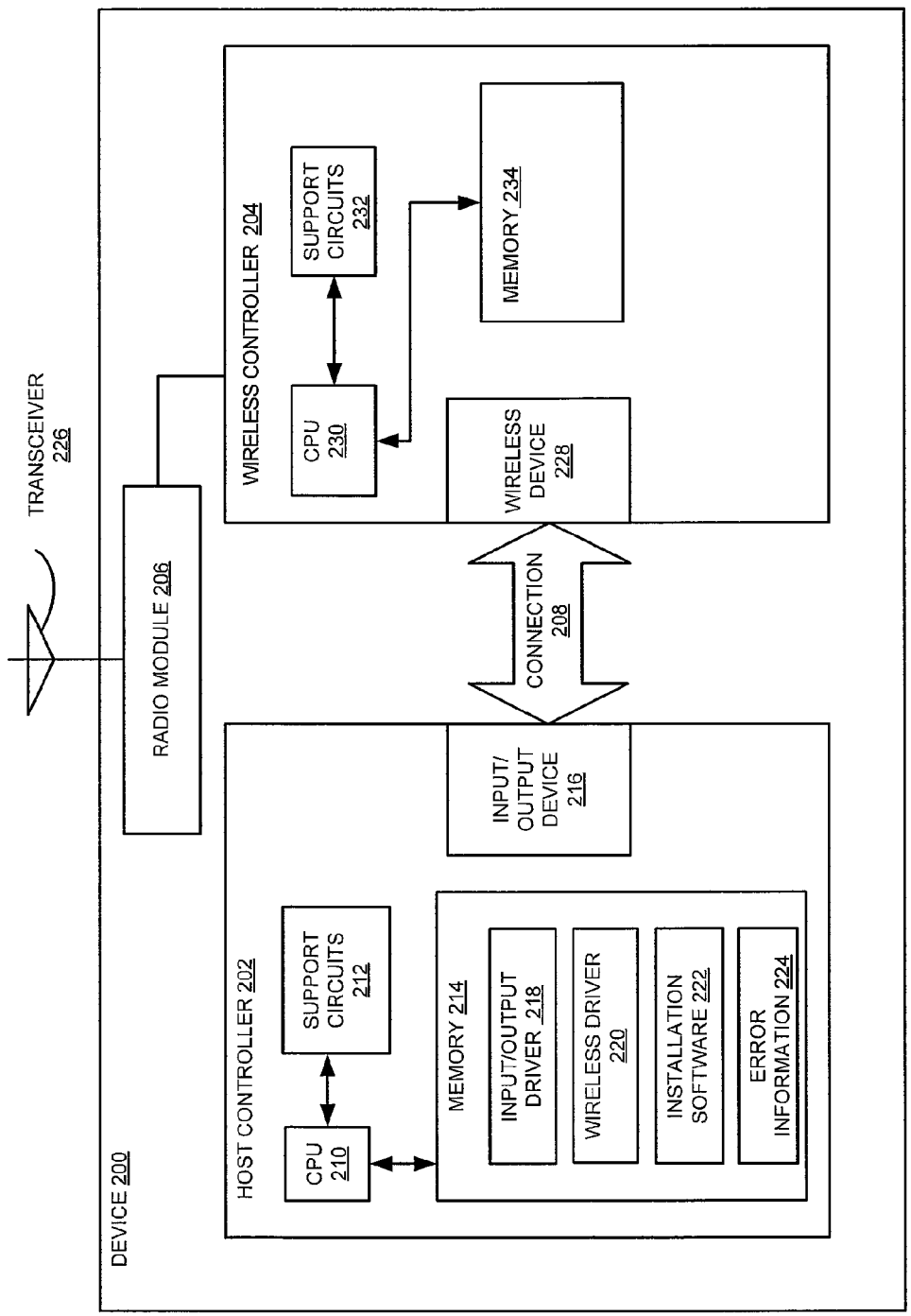
FIG. 2 is a block diagram of a device for installing a input/output driver and a wireless driver to create a network interface between a host controller and a wireless controller, according to one or more embodiments.

FIG. 2 is a block diagram of a device 200 for installing an input/output driver 218 and a wireless driver 220 to create a network interface between a host controller 202 and a wireless controller 204, according to one or more embodiments. In some embodiments, the device 200 includes various internal controllers (i.e., circuits), such as the host controller 202 (e.g., the first internal controller 108 of FIG. 1) and the wireless controller 204 (e.g., the second internal controller 110 of FIG. 1), that transmit and receive data through a computer network via a radio module 206. A network interface (e.g., the interface 112 of FIG. 1) facilitates communications between the host controller 202 and the wireless controller 204 though a connection 208 as explained further below.

The device 200 is a type of computing device (e.g., a laptop, a desktop, an electronic book reader, a Personal Digital Assistant (PDA), a mobile phone, a handheld gaming device, a wireless-enabled laptop computer, a portable music player, a portable television, a Wireless Fidelity (Wi-Fi) card and/or the like) known to one of ordinary skill in the art having the benefit of this disclosure. The device 200 may use other wireless communications protocols, such as Bluetooth or any of several cell phone communications protocols within the scope of various embodiments. The device 200 may also be a Global Positioning System (GPS)-enabled communication device, such as a mobile phone that provides direction information and/or position information.

The host controller 202 includes a CPU 210, various support circuits 212 and a memory 214. The CPU 210 may include one or more commercially available microprocessors or microcontrollers that facilitate data processing and storage. Various support circuits 212 facilitate operation of the CPU 210 and may include clock circuits, buses, power supplies, input/output circuits and/or the like. The memory 214 includes a Read Only Memory, Random Access Memory, disk drive storage, optical storage, removable storage, and the like. The host controller 202 further includes an input/output device 216 for communicating instructions to the wireless controller 204 as explained further below. The memory 214 stores various interface drivers, such as an input/output driver 218 (e.g., the first interface driver 114 of FIG. 1) and a wireless driver 220 (e.g., a second interface driver 116 of FIG. 1). The memory 214 also includes installation software 222 executes instructions for ensuring successful installation of the various interface drivers of which the input/output driver 218 and the wireless driver 220 form the network interface. The memory 214 also includes error information 224.

The wireless controller 204 may be a single microchip or may be a circuit board (possibly enclosed in a case, with suitable connectors) with one or more microchips. The wireless controller 204 includes a media access control (MAC) device, such as a dedicated MAC chip or a microprocessor programmed or configured to operate as a MAC device. The wireless controller 204 includes a wireless device 228 for processing communications from the host controller 202 via the input/output device 216. The wireless controller 204 includes a CPU 230, support circuits 232 and a memory 234. The CPU 230 may include one or more commercially available microprocessors or microcontrollers that facilitate data processing and storage. Various support circuits 232 facilitate operation of the CPU 230 and may include clock circuits, buses, power supplies, input/output circuits and/or the like. The memory 234 includes a Read Only Memory, Random Access Memory, disk drive storage, optical storage, removable storage, and the like.

Generally, an operating system is configured to execute operations on one or more internal controllers or devices, such as Network Interface Cards (NICs), hard disks, virtualization layers, firewalls and/or the like. For example, the installation software 222 calls commands associated with the operating system (i.e., native operating system commands) to perform various file system and/or storage operations, such as creating files or metadata, writing data to the files, reading data from the files, modifying metadata associated with the files and/or the like. Various software pages call one or more functions associated with a first interface driver, such as the input/output driver 218 and a second interface driver, such as the wireless driver 220, to execute various network communication operations. As an example, the operating system may utilize the wireless driver 220 associated with a Network Interface Card (NIC) card to communicate data to another computer, such as a server for providing multimedia content.

The input/output driver 218 and the wireless driver 220 are configured to operate the input/output device 216 and the wireless device 228 respectively. Once the input/output driver 218 and the wireless driver 220 are installed successfully, the input/output device 216 and the wireless device 228 become functional and collectively form the network interface. As explained further below, the installation software 222 ensures successful completion of a first interface driver installation process associated with the input/output driver 218 as well as a second interface driver installation process associated with the wireless driver 220.

Figure 3:
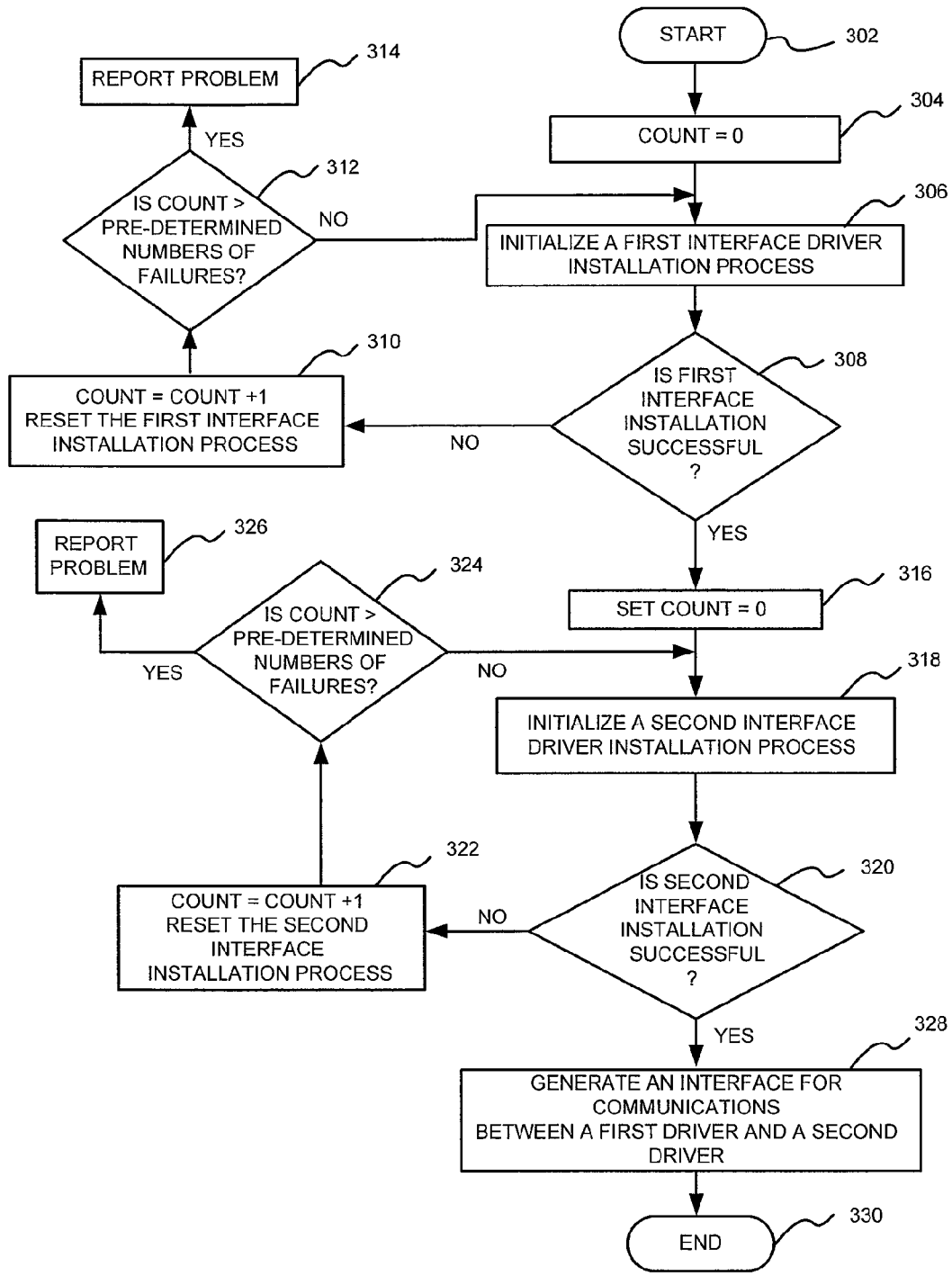
FIG. 3 is a flow diagram of a method for iterating a first interface driver installation process and a second interface driver installation process to facilitate creation of a network interface between a first internal controller and a second internal controller, according to one or more embodiments, according to one or more embodiments.

The installation software 222 iterates the first interface driver installation process until the installation process is successful or fails for a predetermined number of times, such as three times (Refer to FIG. 3 for further explanation). After successful installation of the input/output driver 218, the installation software 222 iterates the second interface driver installation process until success or a predetermined number of failures. After successfully installing the wireless driver 220, the installation software 222 generates the network interface for communications between the host controller 202 and the wireless controller 204. In some embodiments, the installation software 222 records error information 224 indicating a success or failure for each driver installation process attempt.

The radio module 206 is operatively coupled to the wireless controller 204 and enables communication of data between the device 200 and a service provider server (i.e., the server 102 of FIG. 1) via a transceiver 226. The host controller 202 issues commands to the input/output device 216, which communicates these commands to the wireless device 228 via the connection 208. In turn, the wireless controller 204 communicates with the service provider. The radio module 206 may configured to modulate outgoing wireless messages for transmission via the transceiver 224. In some embodiments, the radio module 206 receives voice and audio data from Internet radio stations, which are played for the user. The radio module 206 may also receive metadata describing the voice and audio data.

FIG. 3 illustrates a flow diagram of a method 300 for iterating a first interface driver installation process and a second interface driver installation process to facilitate creation of a network interface between a first internal controller and a second internal controller, according to one or more embodiments. In some embodiments, the method 300 is performed in response to at least one of a powered-up sequence, a hardware reset and/or a reboot command (e.g., a yamon reboot). The method 300 starts at step 302 and proceeds to step 304, at which the method 300 sets a counter to 0. The counter forms a portion of error information (e.g., the error information 224 of FIG. 2) associated with network interface utilization. The counter corresponds with a predetermined number of failed interface driver installations. During step 304 to 314, the method 300 iterates an installation process for a first interface driver until the predetermined number of failures as explained further below.

At step 306, the method 300 initializes the first interface driver installation process. In some embodiments, the first interface driver (e.g., the first interface driver 114 of FIG. 1 and the input/output driver 218) of a first internal controller (e.g., the host controller 202) is installed during the first interface driver installation process. In some embodiments, installation software (e.g., the installation software 222 of FIG. 2) executes the first interface driver installation process. For example, the installation software copies one or more files that include software code and data for operating the first interface driver, such as an input/output driver. As a result, the installation software configures a logical device, such as an input/output device (e.g., the input/output device 216 of FIG. 2), within the first internal controller, such as a host controller. The logical device enables software programs to communicate data (i.e., instructions) to and/or from a second internal controller, such as a wireless controller (e.g., the wireless controller 204 of FIG. 2).

At step 308, the method 300 determines whether the first interface driver installation process is successful. If it is determined that the first interface driver installation process succeeded (option "YES"), the method 300 proceeds to step 316. In some embodiments, the method 300 determines whether the first interface driver installation process succeeded by examining the error information. If the error information indicates that no errors occurred during the first interface driver installation process, which includes configuring each and every device setting, file and/or the like properly, the method 300 proceeds to install a second interface driver, such as a wireless driver (e.g., the wireless driver 220 of FIG. 2).

If the method 300 determines that the first interface driver installation process is not successful (option "NO"), the method 300 proceeds to step 310. In some embodiments, the method 300 examines the error information for indicia of installation failure. Problems that occurred during the installation process may include corrupt files, incompatible device settings and/or the like. At step 310, the method 300 increases the counter by one (1) and resets the first interface installation process. The method 300 proceeds to step 312.

At step 312, the method 300 determines whether the counter is greater than a predetermined number of failures. In some embodiments, the installation software compares the counter to the error information, which stores the predetermined number of failures. In some embodiments, the predetermined number of failures is equal to three (3). If it is determined that the counter is greater than or equal to a predetermined number of failures (option "YES"), the method 300 proceeds to step 314. At step 314, the method 300 reports a problem. In some embodiments, the installation software records the problem in the error information. If the method 300 determine that the counter is less than a predetermined number of failures (option "NO"), the method 300 proceeds to step 306.

The method 300 proceeds to step 316, at which the method 300 sets a counter to 0. During step 316 to 330, the method 300 iterates an installation process for the second interface driver until another predetermined number of failures as explained further below. At step 318, the method 300 initializes a second interface driver installation process. In some embodiments, the installation software initializes such an installation process for the second interface driver (i.e., the wireless driver 220) for operating a second internal controller (i.e., the wireless controller 204).

At step 320, the method 300 determines whether the second interface driver installation process is successful. If it is determined that the second interface driver installation process is successful (option "YES"), the method 300 proceeds to step 328. If the method 300 decides that the second interface driver installation process is not successful (option "NO"), the method 300 proceeds to step 322. At step 322, the method 300 increases the counter by one (1) and resets the second interface installation process. The method 300 proceeds to step 324.

At step 324, the method 300 determines whether the count is greater than the other predetermined number of failures. In some embodiments, the installation software compares the counter to the error information, which stores the predetermined number of failures. In some embodiments, the predetermined number of failures is equal to three (3). If it is determined that the count is greater than or equal to the predetermined number of failures (option "YES"), the method 300 proceeds to step 326. At step 326, the method 300 reports a problem. In some embodiments, the second internal controller records the problem in the error information. If the method 300 determines whether the counter is less than the other predetermined number of failures (option "NO"), the method 300 proceeds to step 318.

The method 300 proceeds to step 328, at which the method 300 generates an interface for communications between the first interface driver 114 and the second interface driver 116. In some embodiments, the first internal controller 202108 establishes a communication with the second internal controller 110 through a physical connection (e.g., a bus, such as the connection 208 of FIG. 1). The method proceeds to step 330, at which the method 300 ends.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated display device via inter-computer communication. Some or all of the device components or data structures may also be stored (e.g., as instructions or structured data) on a computer-accessible medium or a portable article to be read by an appropriate drive, various examples of which are described above. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for installing an input/output interface driver and a network interface driver in a mobile device, comprising:
    iterating the input/output interface driver installation process until a predetermined number of failures occurs, wherein the failures are a portion of input/output interface driver error information comprising at least one of corrupt files or incompatible device settings and the input/output driver installation process automatically restarts when the method encounters the error information up to the predetermined number of failures;
    if the input/output interface driver installation process is successful, iterating the network interface driver installation process until another predetermined number of failures occurs, wherein the failures are a portion of network interface driver error information comprising at least one of corrupt files or incompatible device settings and the network driver installation process automatically restarts when the method encounters the error information up to the another predetermined number of failures; and
    if the network interface driver installation process is successful, generating an interface for communications between an input/output internal controller and a network internal controller.

2. The method of claim 1, wherein at least one of the predetermined number of failures or the other predetermined number equals three.

3. The method of claim 1 further comprising if the input/output interface driver installation process is unsuccessful, recording error information.

4. The method of claim 1 further comprising if the network interface driver installation process is unsuccessful, recording error information.

5. The method of claim 1, wherein iterating the input/output interface driver installation process further comprises in response to at least one of a powered-up sequence, a hardware reset and/or a reboot command.

6. The method of claim 1, wherein the input/output interface driver is associated with a first internal controller and the network interface driver is associated with a second internal controller.

7. A computerized method for installing an input/output interface driver and a wireless interface driver, comprising:
    iterating an input/output interface driver installation process until a predetermined number of failures occurs, wherein the failures are a portion of a input/output interface driver error information comprising at least one of corrupt files or incompatible device settings and the driver installation process automatically restarts when the method encounters the error information;

if the input/output interface driver installation process succeeds, iterating a wireless interface driver installation process until another predetermined number of failures occurs, wherein the failures are a portion of a wireless interface driver error information comprising at least one of corrupt files or incompatible device settings and the driver installation process automatically restarts when the method encounters the error information; and if the wireless interface driver installation process succeeds, generating an interface for communications between the input/output interface driver and the wireless interface driver.

8. The method of claim 7 further comprising if the input/output interface driver installation process is unsuccessful, recording error information.

9. The method of claim 7 further comprising if the wireless interface driver installation process is unsuccessful, recording error information.

10. The method of claim 7, wherein iterating the input/output interface driver installation process further comprises in response to at least one of a powered-up sequence, a hardware reset and/or a reboot command.

11. The method of claim 7, wherein at least one of the predetermined number of failures or the other predetermined number of failures equals three.

12. A device for facilitating creation of a network interface, comprising:

installation software for iterating an input/output interface driver installation process until a predetermined number of failures occurs, if the input/output interface driver installation process is successful, iterating a network interface driver installation process until another predetermined number of failures occurs and generating an interface for communications between the input/output interface driver and the network interface driver, if the network interface driver installation process is successful, wherein the failures are a portion of a input/output interface driver error information comprising at least one of corrupt files or incompatible device settings and the driver installation process automatically restarts when the method encounters the error information.

13. The device of claim 12 further comprising a radio module for communicating multimedia content with a plurality of servers.

14. The device of claim 12 further comprising a connection for between an input/output internal controller and a wireless internal controller.

15. The device of claim 12, wherein the installation software records error information if the input/output interface driver installation process is unsuccessful.

16. The device of claim 12, wherein the wireless internal controller records error information indicating the other predetermined number of failures, if the wireless interface driver installation process is unsuccessful.

17. The device of claim 12, wherein the input/output first interface driver installation process iterates in response to at least one of a powered-up sequence, a hardware reset and/or a reboot command.

18. The device of claim 12, wherein at least one of the predetermined number of failures or the other predetermined number of failures equals three.

* * * * *